United States Patent [19]
Cheng et al.

[11] Patent Number: 6,014,230
[45] Date of Patent: *Jan. 11, 2000

[54] CONTACT IMAGE SENSOR FOR USE WITH A SINGLE ENDED POWER SUPPLY

[75] Inventors: Chiden Cheng; W. S. Chen; Tonny Fu; H. Y. Chen, all of Taipei Hsien, Taiwan

[73] Assignee: Dyna Image Corporation, Taipei, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 08/659,001

[22] Filed: Jun. 4, 1996

[51] Int. Cl.$^7$ ....................................................... H01J 40/14
[52] U.S. Cl. ............................................ 358/482; 358/483
[58] Field of Search ..................................... 358/482–483; 348/249–250, 282–283, 298–299, 311–314

[56] References Cited

U.S. PATENT DOCUMENTS

| | | | |
|---|---|---|---|
| 4,263,621 | 4/1981 | Berke | 348/294 |
| 4,556,851 | 12/1985 | Levine | 329/50 |
| 4,796,091 | 1/1989 | Nohtomi | 358/256 |
| 5,296,696 | 3/1994 | Uno | 250/208.1 |
| 5,322,994 | 6/1994 | Uno | 250/208.1 |

*Primary Examiner*—Thomas D Lee
*Assistant Examiner*—Stephen Brinich
*Attorney, Agent, or Firm*—Rosenberg, Klei & Lee

[57] ABSTRACT

A contact image sensor for use in a fax machine or scanner, including a driver, at least one sensor chip, an analog switch, a capacitor, an operational amplifier, a uni-power supply, a voltage converter, and a voltage converter. In an alternate form of the present invention, the operational amplifier and the voltage converter are omitted.

1 Claim, 4 Drawing Sheets

CONTACT IMAGE SENSOR FOR USE WITH A SINGLE ENDED POWER SUPPLY

BACKGROUND OF THE INVENTION

The present invention relates to contact image sensors for fax machines and scanners, and relates more particularly to such a contact image sensor which eliminates the floating of the image signal detected.

A regular contact image sensor for use in a fax machine or scanner is shown in FIG. 1. This structure of contact image sensor is comprised of a driver (1'), a first sensor chip (2'), a second sensor chip (3'), an analog switch (4'), a capacitor (5'), an operational amplifier (6'), and a power supply (7'). The power supply (7') provides +5V and −12V DC to the other parts of the contact image sensor. This structure of contact image sensor is complicated and expensive. Furthermore, it requires much installation space.

SUMMARY OF THE INVENTION

It is one object of the present invention to provide a contact image sensor for use in a fax machine or scanner which is simple in structure. It is another object of the present invention to provide a contact image sensor which needs less installation space, and consumes less power supply. It is still another object of the present invention to provide a contact image sensor which is inexpensive to manufacture. It is still another object of the present invention to provide a contact image sensor which achieves a broad detecting area. It is still another object of the present invention to provide a contact image sensor which eliminates the floating of the image signal. According to one embodiment of the present invention, the contact image sensor comprises a driver, at least one sensor chip, an analog switch, a capacitor, an operational amplifier, a uni-power supply, a voltage converter, and a voltage converter. As an alternate form of the present invention, the operational amplifier and the voltage converter may be omitted.

DETAILED DESCRIPTION OF THE PREFERRED EMBODIMENT

Figure 1:
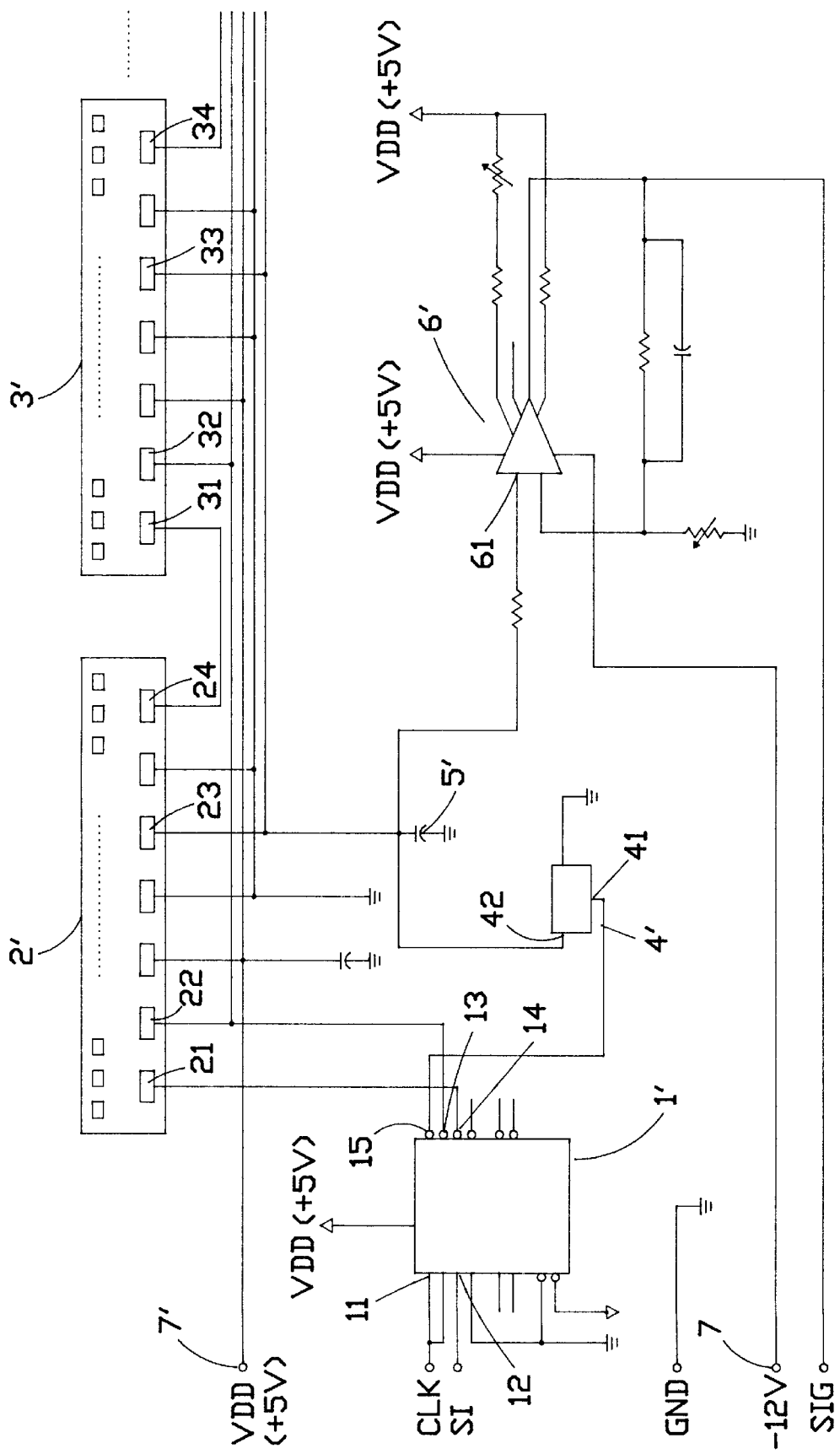
FIG. 1 is a circuit diagram of a contact image sensor according to the prior art.
Figure 2:
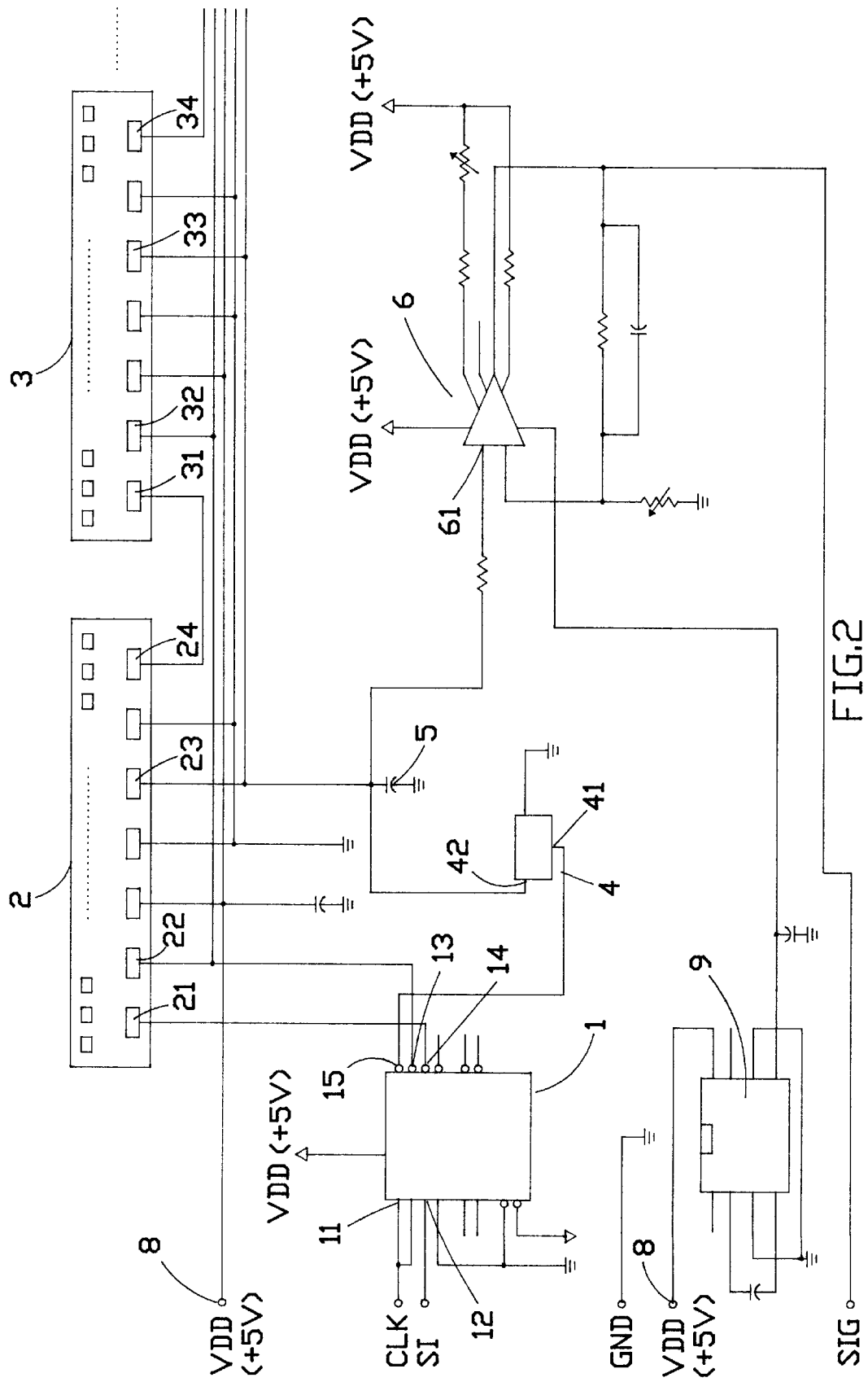
FIG. 2 is a circuit diagram of a contact image sensor according to one embodiment of the present invention.

FIG. 2 shows the circuit of a contact image sensor according to a first embodiment of the present invention. The circuit comprises a driver 1, a first sensor chip 2, a second sensor chip 3, an analog switch 4, a capacitor 5, an operational amplifier 6, a uni-power supply 8, and a voltage converter 9. The driver 1 is controlled by the time sequence signal of the computer to drive the first sensor chip 2 and the second sensor chip 3. The sensor chips 2,3 pick up a respective image signal from document, then convert the picked up image signals into corresponding signal charge and voltage respectively, and then send the respective signal charge and voltage to the capacitor 5 and the operational amplifier 6. The analog switch 4 is controlled by the control signal of the driver 1 to drive the capacitor 5, causing it to discharge electricity. The operational amplifier 6 receives and amplifies the output electric signal from the sensor chips 2,3, requiring +5 and −12V DC for operation. The uni-power supply 8 provides +5V to the driver 1, the sensor chips 2,3, the analog switch 4, the capacitor 5, and the operational amplifier 6. The voltage converter 9 provides −12V to the operational amplifier 6.

Figure 3:
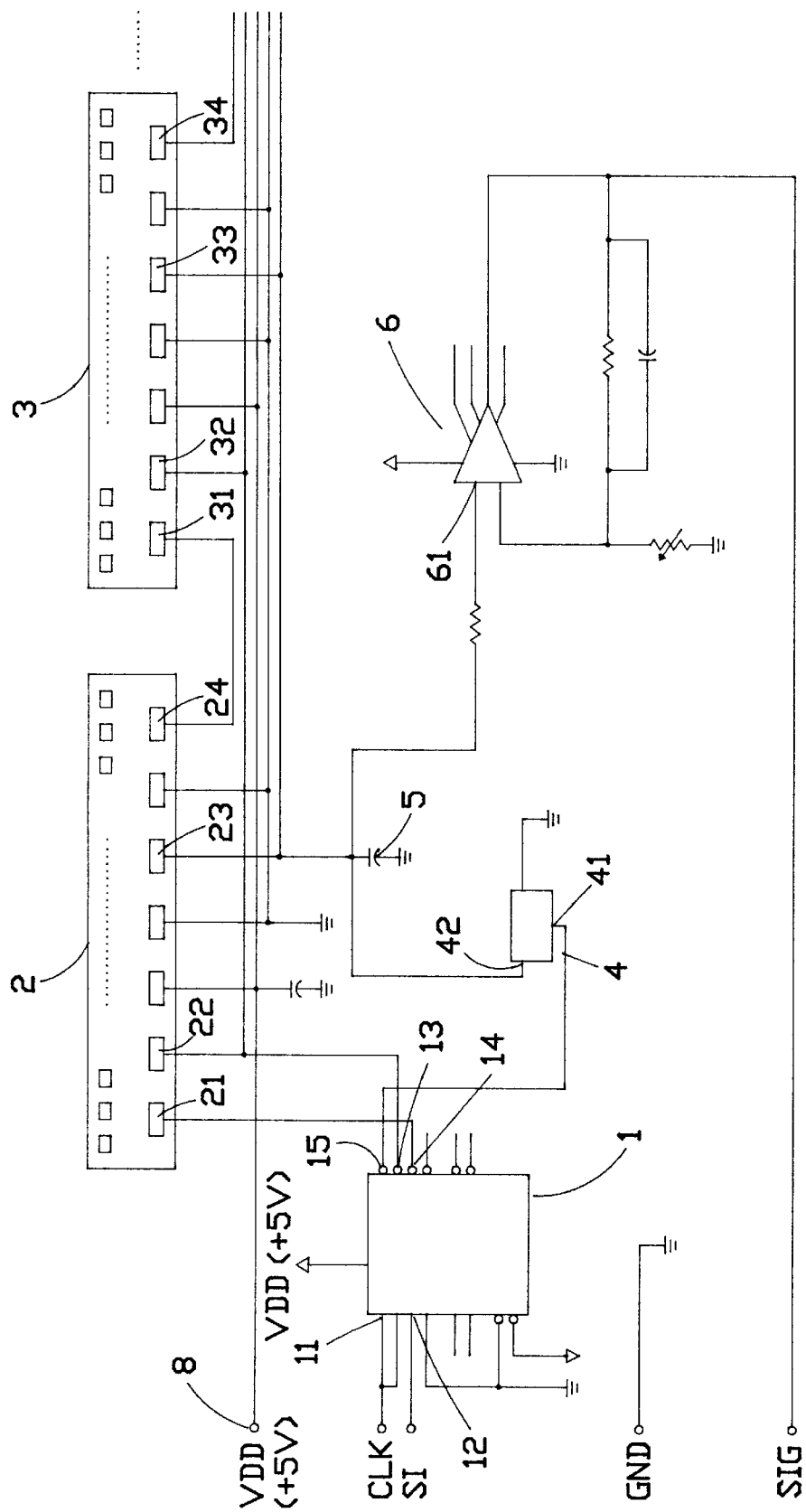
FIG. 3 is a circuit diagram of a contact image sensor according to a second embodiment of the present invention.

FIG. 3 shows the circuit of a contact image sensor according to a second embodiment of the present invention. According to this alternate form, the contact image sensor is comprised of a driver 1, a first sensor chip 2, a second sensor chip 3, an analog switch 4, a capacitor 5, an operational amplifier 6, and a uni-power supply 8. The operation of this alternate form is similar to that of the first embodiment of the present invention. According to this alternate form, the operational amplifier 6 consumes only +5V. Because the operational amplifier 6 consumes only +5V, the aforesaid voltage converter 9 is omitted.

Figure 4:
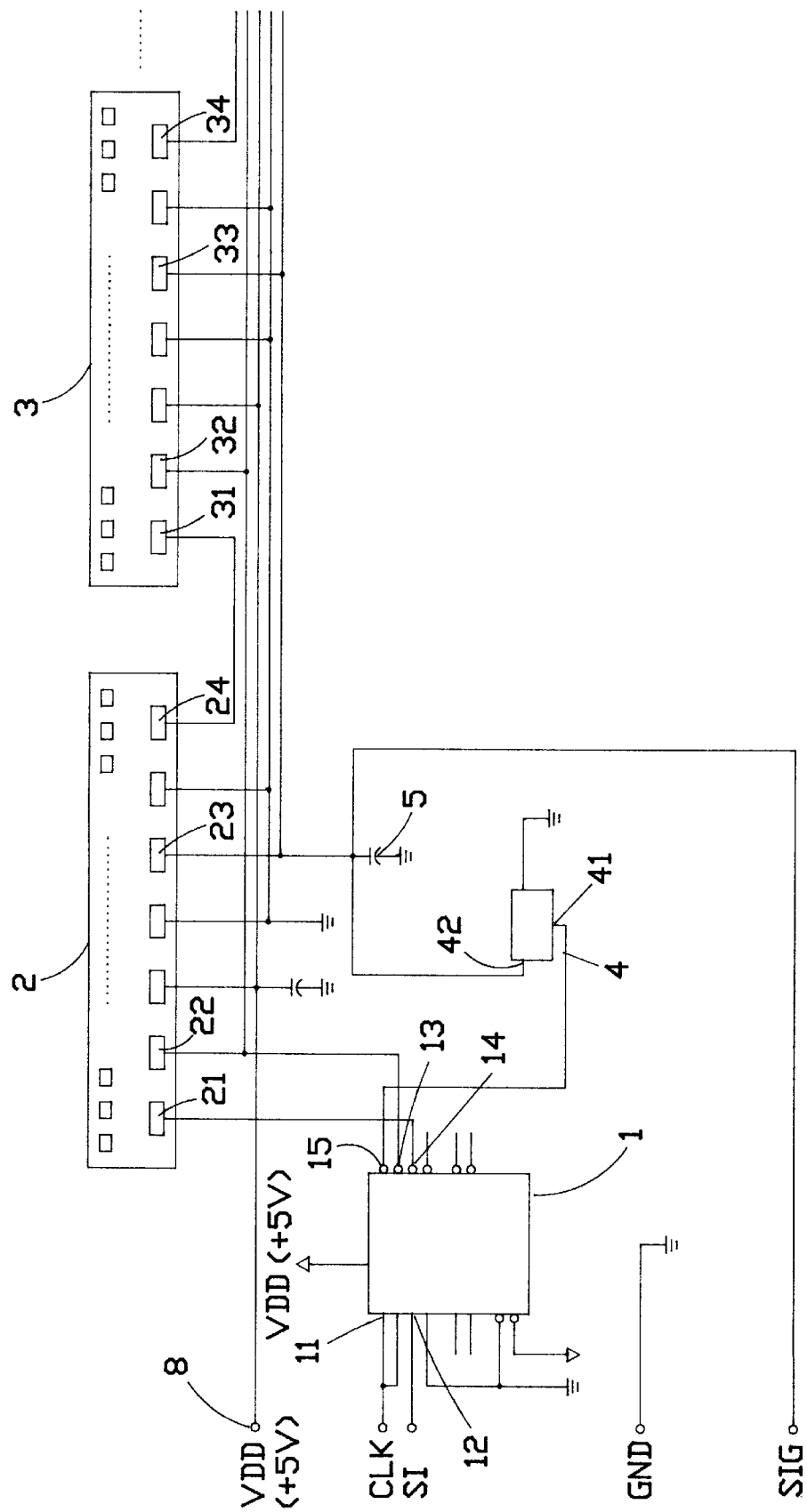
FIG. 4 is a circuit diagram of a contact image sensor according to a third embodiment of the present invention.

FIG. 4 shows the circuit of a contact image sensor according to a third embodiment of the present invention. According to this alternate form, the contact image sensor is comprised of a driver 1, a first sensor chip 2, a second sensor chip 3, an analog switch 4, a capacitor 5, and a uni-power supply 8. This alternate form eliminates the installation of an operational amplifier 6 and a voltage converter 9. Because the aforesaid operational amplifier 6 is omitted, the output signal charge and voltage of the sensor chips 2,3 are directly transmitted to the capacitor 5.

The driver 1 can be for example a 74HC367 or 74HC368 having a clock input leg 11, an initial pulse input leg 12, a clock output leg 13, an initial pulse output leg 14, and a control signal output leg 15. The time sequence signal produced by the peripheral apparatus is comprised of a clock signal and an initial pulse signal. The driver 1 receives the clock signal and initial pulse signal of the time sequence signal of the peripheral apparatus through the clock input leg 11 and the initial pulse input leg 12. The clock signal is then outputted from the driver 1 through the clock signal output leg 13 to the clock input leg 22 of the first sensor chip 2 and the clock input leg 32 of the second sensor chip 3. The initial pulse signal is inputted into the driver 1 through the initial pulse input leg 12, and then outputted from the driver 1 through the initial pulse output leg 14 to drive the initial pulse input leg 21 of the first sensor chip 2. The sensor chips 2,3 are respectively comprised of a plurality of charge-coupled devices which convert detected image signals into corresponding signal charge for output. The first sensor chip 2 comprises an initial pulse input leg 21, a clock input leg 22, a signal output leg 23, and a terminal processing leg 24. The second sensor chip 3 comprises an initial pulse input leg 31, a clock input leg 32, a signal output leg 33, and a terminal processing leg 34. The driver 1 sends the received initial pulse signal to the initial pulse input leg 21 of the first sensor chip 2 through the initial pulse output leg 14, and then the first sensor chip 2 sends the received initial pulse signal to the initial pulse input leg 31 of the second sensor chip 3 through the terminal processing leg 24. The signal charge and voltage detected by the sensor chips 2,3 are respectively outputted to the capacitor 5 by the respective signal output legs 23,33.

The analog switch 4 can be a 4066 chip, having an input end 41 connected to the control signal output leg 15 of the driver 1 to receive its control signal, and an output end 42 connected to the signal output leg 23 of the first sensor chip 2, the signal output leg 33 of the second sensor chip 3, and the capacitor 5.

The capacitor 5 can be a 270P capacitor connected to the output end 42 of the analog switch 4, and the signal output legs 23,33 of the first sensor chip 2 and second sensor chip 3 to accumulate the signal charge and voltage of the sensor chips 2,3. When the signal charge and voltage have been completely outputted from the sensor chips 2,3, the capacitor 5 is controlled by the output end 42 of the analog switch 4 to discharge electricity rapidly, so as to become ready for receiving the signal charge and voltage of a next time sequence signal.

The operational amplifier 6 can be a 34071 chip, having an input end 61 connected to the signal output leg 23 of the first sensor chip 2 and the signal output leg 33 of the second sensor chip 3, and an output end 62 for outputting amplified signal.

As indicated, the clock signal of the driver 1 is outputted through the clock output leg 13 to the clock input legs 22,32 of the sensor chips 2,3, i.e., the clock signal is transmitted to the first sensor chip 2 and the second sensor chip 3 in parallel; the initial pulse signal of the driver 1 is outputted through the initial pulse output leg 14 to the initial pulse input leg 21 of the first sensor chip 2, and then transmitted from the terminal processing leg 24 of the first sensor chip 2 to the initial pulse input leg 31 of the second sensor chip 3, i.e., the initial pulse signal of the driver 1 is transmitted to the first sensor chip 2 and the second sensor chip 3 in series.

It is to be understood that the drawings are designed for purposes of illustration only, and are not intended as a definition of the limits and scope of the invention disclosed.

What the invention claimed is:

1. A contact image sensor comprising:

a driver having a clock input leg and an initial pulse input leg adapted for receiving a clock signal and an initial pulse signal of a time sequence signal of a peripheral apparatus, said driver having a clock output leg and an initial pulse output leg adapted for output of said clock signal and the initial pulse signal received from the peripheral apparatus said driver having a control signal output leg adapted for output of a control signal;

at least one sensor chip respectively controlled by said driver to pick up an image of a document and to convert the picked up image signal into a corresponding voltage signal for output, said at least one sensor chip having a clock input leg and an initial pulse input leg adapted for receiving the clock signal and initial pulse signal output from said driver, and a signal output leg;

an analog switch having an input end connected to the control signal output leg of said driver to receive the control signal therefrom, and a pair of switched ends respectively connected to the signal output leg of said at least one sensor chip and a voltage reference terminal, said pair of switched ends being electrically coupled together responsive to said control signal;

a capacitor connected to the switched end of said analog switch and the signal output leg of each of said at least one sensor chip to accumulate the signal voltage obtained from said at least one sensor chip, said capacitor being controlled by said analog switch to discharge electricity therefrom prior to receiving the signal voltage of a next time sequence signal responsive to said pair of switched ends being electrically coupled together;

an operational amplifier adapted for receiving and amplifying the signal voltage output from said at least one sensor chip;

a power supply for providing a positive voltage and reference potential to said driver, said at least one sensor chip, said analog switch, and said operational amplifier; and a voltage converter coupled to said power supply for providing a −12V DC to said operational amplifier from said positive voltage.

* * * * *